United States Patent

(12) United States Patent
Trifonov

(10) Patent No.: US 8,073,336 B2
(45) Date of Patent: Dec. 6, 2011

(54) ENTANGLEMENT-BASED QKD SYSTEM WITH ACTIVE PHASE TRACKING

(75) Inventor: Alexei Trifonov, Boston, MA (US)

(73) Assignee: MagiQ Technologies, Inc., Somerville, MA (US)

(*) Notice: Subject to any disclaimer, the term of this patent is extended or adjusted under 35 U.S.C. 154(b) by 741 days.

(21) Appl. No.: 12/223,308

(22) PCT Filed: Jan. 31, 2007

(86) PCT No.: PCT/US2007/002609
§ 371 (c)(1),
(2), (4) Date: Jul. 28, 2008

(87) PCT Pub. No.: WO2007/092220
PCT Pub. Date: Aug. 16, 2007

(65) Prior Publication Data
US 2009/0022322 A1 Jan. 22, 2009

Related U.S. Application Data

(60) Provisional application No. 60/765,128, filed on Feb. 3, 2006.

(51) Int. Cl.
H04L 9/00 (2006.01)
H04K 3/00 (2006.01)

(52) U.S. Cl. ........ 398/150; 398/188; 380/256; 356/450; 356/484

(58) Field of Classification Search .................. 398/150, 398/188
See application file for complete search history.

(56) References Cited

U.S. PATENT DOCUMENTS

| 5,515,438 | A | * | 5/1996 | Bennett et al. | 380/278 |
| 7,254,295 | B2 | * | 8/2007 | Trifonov et al. | 385/27 |
| 7,346,166 | B2 | * | 3/2008 | Inoue et al. | 380/263 |
| 7,409,162 | B2 | * | 8/2008 | Vig et al. | 398/154 |
| 7,415,114 | B2 | * | 8/2008 | Lo et al. | 380/283 |
| 7,437,081 | B2 | * | 10/2008 | Mitchell et al. | 398/154 |
| 7,502,476 | B1 | * | 3/2009 | Trifonov et al. | 380/283 |
| 7,583,803 | B2 | * | 9/2009 | Trifonov | 380/278 |
| 7,587,049 | B2 | * | 9/2009 | Trifonov et al. | 380/263 |
| 7,809,269 | B2 | * | 10/2010 | Mitchell et al. | 398/79 |
| 2002/0140941 | A1 | * | 10/2002 | Pedigo | 356/450 |
| 2004/0258421 | A1 | * | 12/2004 | Conti et al. | 398/183 |
| 2005/0036624 | A1 | * | 2/2005 | Kent et al. | 380/277 |
| 2005/0094818 | A1 |   | 5/2005 | Inoue |  |
| 2005/0100351 | A1 | * | 5/2005 | Yuan et al. | 398/214 |
| 2005/0135620 | A1 | * | 6/2005 | Kastella et al. | 380/256 |
| 2005/0190922 | A1 | * | 9/2005 | LaGasse | 380/278 |
| 2009/0022322 | A1 | * | 1/2009 | Trifonov | 380/278 |

OTHER PUBLICATIONS

Brendel et al., "Pulse energy-time entangled twin-photon source for quantum communication," Phys. Rev. Lett., vol. 82, No. 12, Mar. 22, 1999 (pp. 2594-2597).

* cited by examiner

Primary Examiner — Danny Leung
(74) Attorney, Agent, or Firm — Opticus IP Law PLLC

(57) ABSTRACT

Entanglement-based QKD systems and methods with active phase tracking and stabilization are disclosed wherein pairs of coherent photons at a first wavelength are generated. Second harmonic generation and spontaneous parametric down-conversion are used to generate from the pairs of coherent photons entangled pairs of photons having the first wavelength. Relative phase delays of the entangled photons are tracked using reference optical signals. Classical detectors detect the reference signals while single-photon detectors and a control unit generate a phase-correction signal that maintains the relative phases of phase-delay loops via adjustable phase-delay elements.

6 Claims, 2 Drawing Sheets

ENTANGLEMENT-BASED QKD SYSTEM WITH ACTIVE PHASE TRACKING

CLAIM OF PRIORITY

This patent application claims the benefit of priority of U.S. Provisional Patent Application Ser. No. 60/765,128, filed on Feb. 3, 2006, which application is incorporated by reference herein, and of PCT Patent Application Serial No. PCT/US2007/002609, filed on Jan. 31, 2007, which application is incorporated by reference herein.

TECHNICAL FIELD OF THE INVENTION

The present invention relates to quantum cryptography, and in particular relates to quantum key distribution (QKD) systems and methods using entangled photons.

BACKGROUND ART

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific quantum key distribution (QKD) systems are described in U.S. Pat. No. 5,307,410 to Bennett, and in the article by C. H. Bennett entitled "Quantum Cryptography Using Any Two Non-Orthogonal States", Phys. Rev. Lett. 68 3121 (1992). The general process for performing QKD is described in the book by Bouwmeester et al., "The Physics of Quantum Information," Springer-Verlag 2001, in Section 2.3, pages 27-33, while photon-entanglement is discussed in the same book on pages 53-92

Quantum key distribution (QKD) involves establishing a key between a sender ("Alice") and a receiver ("Bob") by using weak (i.e., 1 photon or less, on average, and typically 0.1 photon on average) optical signals or "qubits" transmitted over a "quantum channel." The security of the key distribution is based on the quantum mechanical principle that any measurement of a quantum system in an unknown state will modify its state. Thus, an eavesdropper ("Eve") that attempts to intercept or otherwise measure the exchanged qubits will introduce errors that reveal her presence.

In some QKD systems, entangled photon pairs are used instead of single photons. In 1991, Ekert proposed a QKD scheme based on entangled photons shared by Alice and Bob, (see A. K. Ekert. "Quantum cryptography based on Bell's theorem", Phys. Rev. Lett., vol. 67 pp. 661-663, (1991) (hereinafter, "Ekert") which article is incorporated by reference herein). In the Ekert 91 protocol, Alice and Bob also can check so-called Bell inequality to reveal the presence of the eavesdropper. Thus, the Ekert protocol provides an additional security level as compared to the BB84 protocol.

The article by J. Brendel, N. Gisin, W. Tittel, and H. Zbinden, entitled "Pulsed Energy-Time Entangled Twin-Photon Source for Quantum Communication", PRL 82, 2594-2597 (22 Mar. 1999) ("Brendel"), which article is incorporated by reference herein, shows a QKD scheme that employs entangled photons. However, the Brendel system is subject to phase drifts and needs to be compensated in order to be of practical use in quantum cryptography. In addition, a commercially viable entanglement-based QKD system must be cost-effective and preferably built from of-the-shelf components. Currently, the 1550 nm wavelength is the most widely used wavelength for fiber-optics communication, so that use of 1550 nm components is preferred when constructing QKD systems, particularly those that meant to be integrated with standard telecommunications networks.

BRIEF DESCRIPTION OF THE INVENTION

QKD systems and methods having time-bin entanglement and active phase tracking and stabilization are disclosed. The method includes generating in an initial state preparation stage ("Charlie") pairs of coherent photons at a first wavelength, such as a known telecommunications wavelength. The method then uses second harmonic generation followed by spontaneous parametric downconversion to generate entangled photon pairs having the first wavelength. A phase loop in Charlie is used to provide a phase delay between the first-wavelength coherent "pump" photons. State detection stages (Alice and Bob) are optically coupled to Charlie and each receive respective entangled photons from Charlie. These photons are given respective second and third phase delays by respective phase delay loops in Alice and Bob. The relative phase delays are tracked using reference optical signals generated by Charlie and that traverse the three phase loops. Classical photodetectors are used to detect the reference signal and a control unit is used to generate a phase-correction signal that maintains the relative phases of the three phase delay loops. Pairs of single-photon detectors are used at Alice and Bob to measure the state of each entangled photon. A standard QKD protocol (e.g., Ekert91) is then followed to establish a quantum key between Alice and Bob.

An example embodiment of the system of the present invention includes three phase-delay loops each formed from optical components used for the popular telecom wavelength of 1550 nm, thereby making the system cost-effective as well as efficient in transmitting light due to the low optical-fiber absorption at this wavelength.

Figure 1:
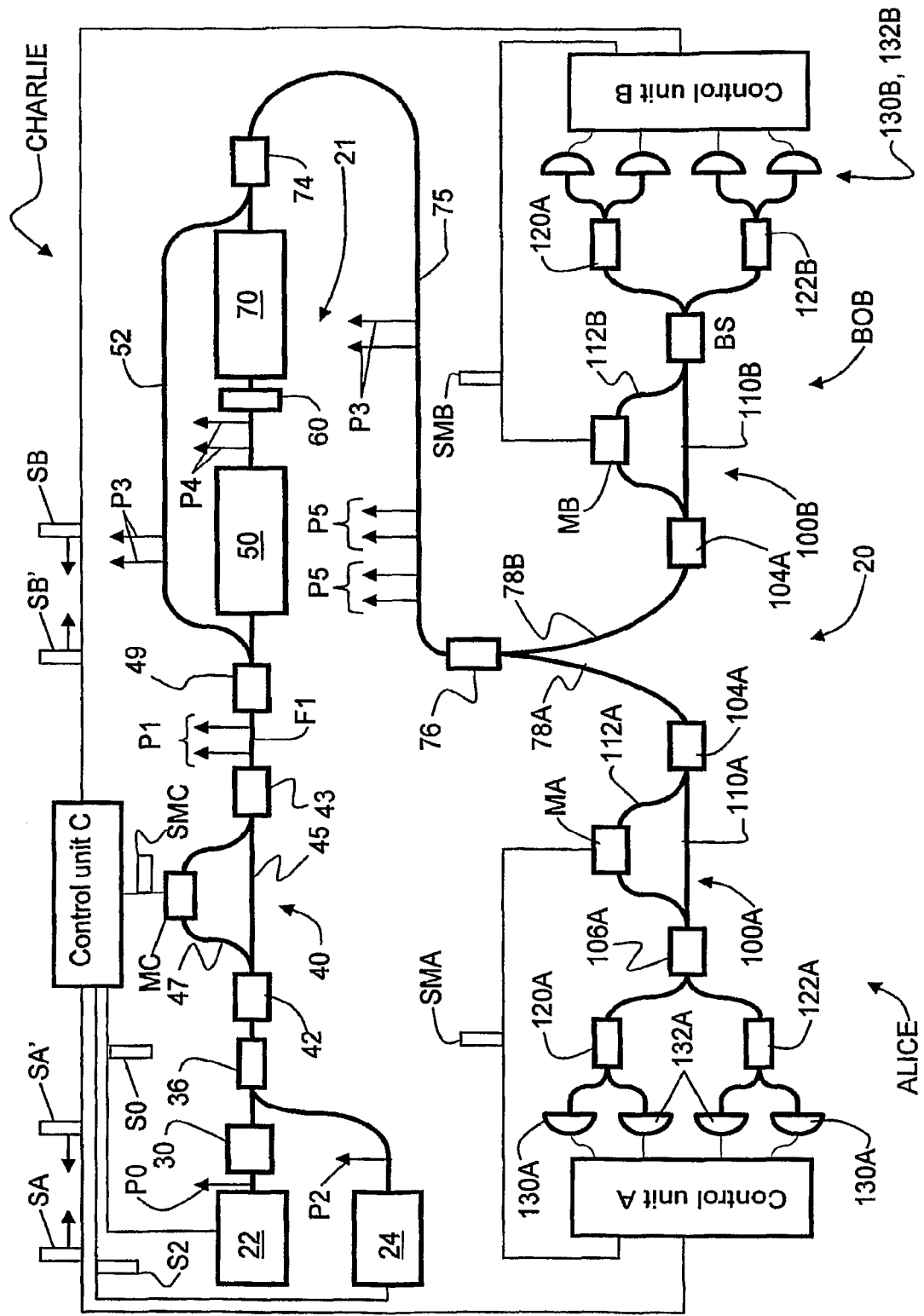
FIG. 1 is a schematic diagram of an example embodiment of a entanglement-based QKD system with active interferometers stabilization according to the present invention.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

In the Figures, like elements are identified by like reference numbers.

DETAILED DESCRIPTION OF THE INVENTION

The present invention relates to quantum cryptography, an in particular relates to quantum key distribution (QKD) systems and methods using entangled photons.

To realize an efficient, robust, and cost-effective entanglement-based QKD system that uses the Ekert91 protocol (or similar protocol), several problems must be addressed and solved. These include: (1) The system must be amenable to construction using commercially available components; (2) the system must be self-maintained so that manual control is not necessary; (3) they system must have relatively high interferometric visibility, and a high degree of entanglement (Bell inequality breaking) must be maintained over the long distance span; and (4) the system is preferably compatible with optical logical gates and quantum memory for future development.

The present invention improves upon the QKD system disclosed in Brendel, and utilizes the stabilization method disclosed in the pending PCT patent application publication serial no. PCT/US04/040991, entitled "Active stabilization of a one-way QKD system," which PCT patent application is incorporated by reference herein. The invention allows state preparation and state detection at one telecommunication ("telecom") wavelength, plus convenient stabilization and synchronization of three QKD stations.

In the description below, in an example embodiment the optical coupling between elements of the system is accomplished using sections of optical fiber.

FIG. 1 is a schematic diagram of an example embodiment of an entanglement-based QKD system 20 according to the present invention. System 20 includes three different QKD station, Charlie, Alice and Bob. Charlie is the state-preparation station, while Alice and Bob are the state-measurement stations.

Charlie

Charlie includes a pump laser 22 and an "reference" laser 24. In an example embodiment, lasers 22 and/or 24 are pulse gain-switched diode lasers that emit light (pulses P1 and P2, respectively) of different wavelengths $\lambda_{22}$ and $\lambda_{24}$ for reasons discussed below. In an example embodiment, an optical amplifier 30, such as an erbium-doped fiber amplifier (EDFA) for 1550 nm light, is optically coupled to laser 22. Lasers 22 and 24 are optically coupled to a wavelength division multiplexer (WDM) 36.

Charlie also includes an optical loop 40 optically coupled to WDM 36. Loop 40 is formed from two beam splitters 42 and 43 and two sections of optical fiber 45 and 47 optically coupled at respective opposite ends to the beam splitters. Optical fiber sections 45 and 47 have different lengths and representing different "arms" of the loop so that loop 40 acts as a delay loop for optical pulses traversing the different optical fiber sections. One of the arms (say 47) includes an adjustable phase delay element MC, such as a phase modulator. Charlie also includes a main control unit C operatively coupled to phase-delay element MC and to lasers 22 and 24. Phase-delay element MC is controlled by main control unit C via a control signal SCM so that the overall phase $\Phi_{40}$ of optical fiber loop 40 can be set (adjusted) to a desired value.

Charlie further includes a WDM 49 optically coupled to beam splitter 43 via an optical fiber section F1. A frequency-doubling element 50 is optically coupled to WDM 49. In an example embodiment, frequency-doubling element 50 includes a periodically-poled lithium niobate (PPLN) waveguide that performs frequency doubling via second harmonic generation (SHG). An optical filter 60 is optically coupled to and arranged optically downstream of frequency-doubling element 50 to filter out any radiation whose frequency was not doubled by the frequency-doubling element.

Charlie also includes an entangled-photon generator 70 optically coupled to and arranged optically downstream of optical filter 60. Entangled-photon generator 70 is also optically coupled to a WDM 74. In an example embodiment, entangled-photon generator includes a periodically poled potassium titanyl phosphate waveguide (PPKTP WG). The choice of using non-linear PPLN and PPKTP waveguides for SHC and SPDC, respectively, is just one possible combination, and other combinations can be used as well. The motivation for using PPLN and PPKTP waveguides, however, is based on the high non-linearity of PPLN (Type I o-o-o) and the good optical quality of the modes of PPKTP WG recently observed (see Trifonov and Zavriyev, "Secure communication with a heralded single-photon source", J. Optics B: Quantum and Semiclassical Optics, 7 (2005) S772-S777). Good optical mode quality is necessary for efficient coupling of downconverted photons into the optical fiber. Other types of waveguides can also be used to obtain high coupling efficiency.

Frequency-doubling element, filter 60 and entangled-photon generator 70 constitute an "up-down conversion section" 21 of system 20 that first increases the frequency of the light pulses and then decreases the frequency of the light pulses so that the quantum signals (i.e., entangled photons P5) used to perform QKD have the same (or substantially the same) wavelength as the original pump pulses P1.

Charlie also includes an optical fiber section 52 optically coupled WDM 49 and to WDM 54. Optical fiber section 52 serves as an optical path for bypassing up-down section 21, for reasons discussed below.

An optical fiber section 75 optically couples WDM 74 to an optical splitter 76, to which two optical fiber links 78A and 78B are attached. Optical fiber links 78A and 78B lead to Alice and Bob, respectively.

Alice and Bob

With continuing reference to FIG. 1, in an example embodiment, Alice and Bob have identical configurations. Thus, the description of Alice applies directly to Bob, and analogous reference numbers are used with "A" and "B" suffixes to describe the elements making up Alice and Bob, respectively.

Alice includes an optical loop 100A optically coupled to optical fiber section 78A. Loop 100A is formed from two beam splitters 104A and 106A and two sections of optical fiber 110A and 112A optically coupled at respective opposite ends to the beam splitters. Optical fiber sections 110A and 112A have different lengths and representing different "arms" of the loop so that loop 100A acts as a delay loop for optical pulses traversing the different optical fiber sections. One of the arms (say 112A) includes an adjustable phase-delay element MA, e.g., a phase modulator MA.

Beam splitter 106A is optically coupled to two WDMs 120A and 122A, which are each in turn optically coupled to respective classical (i.e., non-single-photon) photodetectors 130A and respective single-photon detectors (SPD) 132A. Each detector is in turn electrically coupled to a control unit A, which in turn is operably coupled to main control unit C, as well as to phase delay element MA.

Bob's construction is identical, as mentioned above, wherein Bob is optically coupled to Charlie via optical fiber link 78B and splitter 76. Bob's control unit B is also operably coupled to main control unit C. Control signals SA and SB from respective control units A and B are used to communicate with main control unit C. Likewise, control signals SA' and SB' from main control unit C are used to communicate from the main control unit to control units A and B, respectively.

Delay loops such as delay loops 40, 100A and 100B can be constructed using several methods, e.g. unbalanced Mach-Zehnder interferometer, Michelson interferometer with Faraday mirrors, etc. The actual choice is dictated by the system's target parameters and is not essential for the overall system configuration. Charlie's adjustable phase-delay element MC is not essential implementing the Ekert91 protocol, but in an example embodiment it is included because it can be useful for other protocol implementations (e.g., secret sharing protocols) and can also be adjusted to compensate for variations in phase caused by environmental effects.

Method of Operation

With continuing reference to FIG. 1, in the operation of system 20, main control unit C sends a signal S0 to laser 22 to cause laser 22 to emit laser pulses P0 having a first wavelength $\lambda_1$. In an example embodiment, laser pulses P0 are ~100 ps in duration. Also in an example embodiment, the first wavelength $\lambda_{22}$ is ~1550 nm. Pulses P0 are optionally amplified by optical amplifier 30, depending on whether stronger amplitude light pulses are required.

Each pulse P0 is split coherently by optical loop 40 to form two pulses of P1 of equal intensity and fixed relative phase as determined by phase element MC, whose phase is set by main control unit C, as discussed below. The two coherent pulses P1 are then re-combined onto the same optical fiber section F1 but with a relative phase and time delay as established by optical loop 40.

Meanwhile, main control unit C activates laser 24 via an activation signal S2 to cause light pulses P2 of a second wavelength $\lambda_{24}$ to be generated and multiplexed with light pulses P0 via WDM 36. Light pulses P2 are also coherently split by optical loop 40 to form pairs of coherent pulses P3 from each light pulse P2. Pulses P3 traverse respective arms 45 and 47 of optical loop 40, and are multiplexed onto optical fiber section F1 with the time and phase delay as established by optical loop 40. Pulses P3 are directed by WDM 49 to traverse optical fiber section 52 (thus bypassing up-down conversion section 21) and then onto optical fiber section 75 to optical splitter 76. Pulses P3 are "reference" light pulses used to perform relative phase tracking of Charlie, Alice and Bob in order to maintain system stability, as explained below.

Figure 2:
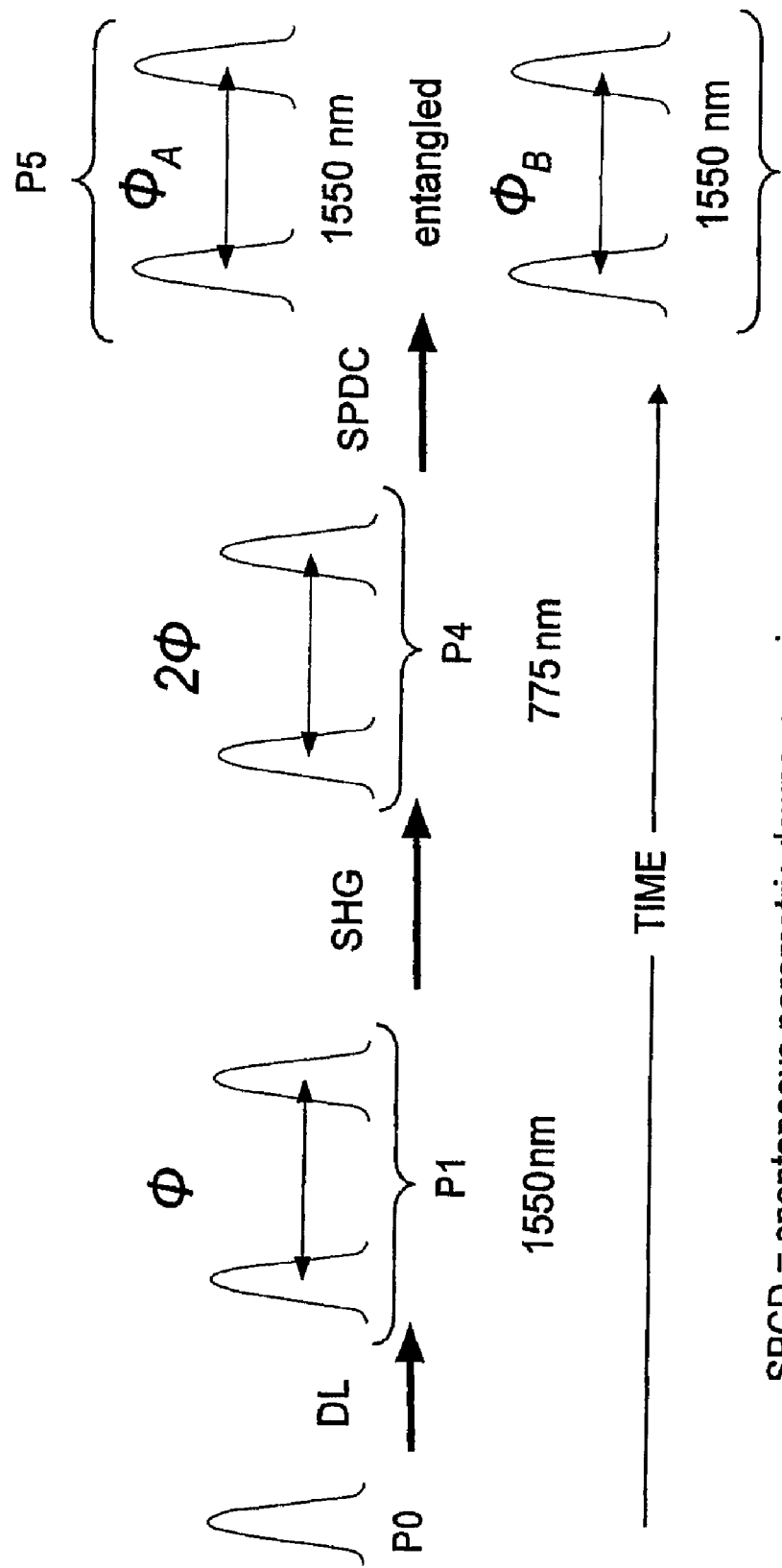
FIG. 2 is a schematic timing diagram illustrating the generation of photons P5 from each pulse P1 from the system of FIG. 1, also illustrating the relative phases associated with each optical fiber loop that the corresponding pulses encounter.

Pulses P1 meanwhile are directed by WDM 49 to frequency-doubling element 50, which doubles the frequency of pulses P1 to form corresponding optical pulses P4 having a wavelength $\lambda_4 = \lambda_{22}/2$. Pulses P4 then pass through optical filter 60, which serves to remove any light that is not frequency doubled by frequency doubling element 50. Filtered pulses P4 then encounter entangled-photon generator 70, which generates two entangled photons P5 (one being the signal photon, the other being the idler photon) for each pulse P4, wherein the entangled photons P5 have a wavelength $\lambda_5 = 2(\lambda_4) = 2(\lambda_{22}/2) = \lambda_{22}$, the original wavelength of light source 22. Note that pulses P5 leaving entangled-photon generator 70 are single photon level. Photons P5 are then multiplexed onto optical fiber section 75 at WDM 74 so that both reference pulses P3 (which bypassed up-down conversion section 21) and photons P5 (generated by the up-down conversion section) travel over optical fiber section 75 to splitter 76. FIG. 2 is a schematic timing diagram illustrating the generation of photons P5 from each pulse P1 and the relative phases associated with each optical fiber loop that the corresponding pulses encounter.

Photons P5 traveling over optical fiber section 75 encounter splitter 76, which is adapted to direct one photon P5 to Alice and the other photon P5 to Bob. These photons are then used to carry out entangled-photon QKD, as described in Brendel and in Ekert. Modulation of Alice's and Bob's phase-delay elements MA and MB is performed by their respective control units A and B sending the phase-delay elements respective modulation signals SMA and SMB.

It is important that the up-conversion process carried out in up-down-conversion section 21 of system 20 be a coherent process. Thus, the coherence created between two pulses P1 by the unbalanced MZ interferometer of optical fiber loop 40 is preserved. The, the frequency-doubled pulses P4 formed by frequency doubling element 50 are coherent with each other (e.g., have a relative phase). Due to the different wavelengths of initial pulses P1 and frequency-converted pulses P4, the relative phases of the initial and converted pulses P1 and P4 are different.

In case of SHG, the phases of pulses P1 and P4 are linked by the following relation $$f_{2w} = [2\pi/\lambda_{SHG}](DL) = 2f_w \quad (1.1)$$

where DL is the Mach-Zehnder optical path difference between the interferometer arms, and $\lambda_{SHG} = \lambda_4$ is the wavelength of converted (i.e., frequency doubled) light pulses P4. Light pulses P4 serve as the pump light for entangled-photon generator 70.

To implement the Ekert91 protocol or similar protocol using time-bin entangled photons P5, the initial relative phases of the pump, signal, and idler photons (having respective frequencies of $f_{SHG}$, $f_s$, and $f_i$) must be linked by the following condition:

$$f_{SHG} = f_s + f_i \quad (1.2)$$

If the initial relative phase between pulses P1 produced by optical fiber loop 40 accumulates a drift d, then the initial relative phase of the converted signals P4 accumulates a drift of 2d. Through the process of active phase tracking, both signal and idler delay loops (say, loops 100A and 100B) accumulate a drift equal to d, thereby compensating each other so that the condition in equation (1.2) above is satisfied. This makes the systems and methods of the present invention very attractive from experimental point of view because the state preparation and state detection are accomplished using the same wavelength, which in an example embodiment is a standard telecom wavelength. This greatly simplifies the choice of components and, as discussed immediately below, the active phase tracking necessary for a commercially viable QKD system.

Active Stabilization of the System

The active stabilization of system 20 is now discussed, wherein the relative phases of the delay loops 100A and 100B in Alice and Bob, respectively, and Charlie's delay loop 40 are stabilized relative to one another. For this reason, laser 24 is included in system 20, wherein in an example embodiment the wavelength $\lambda_{24}$ of laser 24 is the same as or very close to (i.e., substantially the same as) wavelength $\lambda_{22}$ of pump laser 22 and entangled photons P5. In a particular example embodiment, wavelength $\lambda_{24}$ of laser 24 is shifted by one or more channels (so-called lambda-channels used in WDM systems)—say, by a few channels and thus a total of a few nanometers—with respect to wavelength $\lambda_{22}$ of pump laser 22 and entangled photons P5. Having the wavelength $\lambda_{24}$ of reference photons P3 as close as possible to the wavelength $\lambda_{22}$ of entangled photons P5 seeks to closely replicate the conditions under which the entangled photons travel through system 20 and is thus preferred as compared to using disparate wavelengths.

It was shown recently in the pending PCT patent application publication serial no. PCT/US04/040991, entitled "Active stabilization of a one-way QKD system," which PCT patent application is incorporated by reference herein, that this configuration allows for very efficient and cost-effective active stabilization of the Mach-Zehnder interferometer in weak-coherent pulse and single-photon-based QKD. The present invention utilizes a modification of the Zavriyev scheme to stabilize system 20 for QKD using the Ekert91 protocol or similar protocols that utilize entangled photons.

For performing active loop stabilization in system 20, the up-down conversion section 21 of system 20 is bypassed via optical fiber section 52. The pulse P2 from reference laser 24 is multiplexed first at WDM 36 and sent through delay loop 40 and through the arm that includes Charlie's phase element MC so that the resulting pulses P3 include the information about Charlie's relative phase and can be used for active phase tracking. WDM 49 is used for splitting the reference signal pulses P3 (formed from pulses P2) from the main channel and then WDM 74 multiplexes these pulses back into optical fiber section 75 to circumvent up-down conversion section 21, since the reference signal pulses need not be up-down converted. The reference signal pulses P3 are then split at splitter 76, with Bob and Alice each receiving one of the split pulses.

It should be noted that the actual configuration of the third WDM and the splitter can differ from the configuration presented herein. For example, the Alice and Bob photons can be of different wavelengths. In the latter case, both stages can be accomplished by single WDM.

Considering for the moment Alice (the scheme works the same for Bob and Alice due to system symmetry), the reference signal P3 passes through delay loop 100A, is directed by the drop WDM modules 120A and 122A to corresponding classical detectors 132A, which generate a detection signal and provide it to control unit A. The detection of reference signals P3 by respective classical detectors 132A forms a phase-correction signal. A feedback circuit in control unit A (or in main control unit C) adjusts the relative phase of the delay loop 100A (e.g., via phase-delay element MA) to compensate for any thermal and/or vibration drift of the delay loop based on the phase-correction signal, in a similar manner to the aforementioned PCT patent application serial no. PCT/US04/040991.

Meanwhile, the entangled quantum signal (photon P5) goes through drop WDM modules 120A and 122A and to the corresponding SPD 130A where it is detected. Photon P5 is not affected by the presence of the reference signal P3. Bob's portion of system 20 operates in the same manner as Alice to detect the reference and quantum signals.

As it was shown in a recent publication by Trifonov and Zavriyev, "Secure communication with a heralded single-photon source", J. Optics B: Quantum and Semiclassical Optics, 7 (2005) S772-S777, which article is incorporated by reference herein, the single-photon counters are not affected by the presence of reference signal for the distance span up to 100 km. This makes system 20 very robust, cost effective, and reliable.

At this point, system 20 operates as usual based on the particular protocol being used, with Alice and Bob receiving one photon P5 each and performing a Bell test to make sure there is no third copy of the quantum signal. If the random sampling passes the Bell test, then they use the Ekert91 protocol to distill the key. The protocol ends up with error correction and privacy amplification subroutines that are similar to those used in BB84 protocol, and that are carried out in main control unit C to form a final shared quantum key.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An entanglement-based quantum key distribution (QKD) system with active phase tracking and stabilization, comprising:

a state-preparation stage (Charlie) having a pump laser that generates pump pulses of a first wavelength; a reference laser used to create reference pulses having a second wavelength; and an up-down conversion unit that comprises: a) a frequency-doubling element adapted to receive the pump pulses and form therefrom frequency-doubled pulses, and b) an entangled photon generator optically coupled to the frequency-doubling element and adapted to receive each frequency-doubled pulse and form therefrom corresponding entangled idler and signal photons of said first wavelength;

first and second QKD stations (Alice and Bob) optically coupled to Charlie and each adapted to receive and detect one of the entangled idler and signal photons and one of the references pulses, wherein Alice and Bob have respective first and second phase-delay loops with respective first and second phase differences and respective first and second adjustable phase-delay elements; and a controller operably coupled to Alice and Bob that processes the detected reference signals to create a phase-correction signal that is used to adjust at least one of the first and second adjustable phase-delay elements.

2. The system of claim 1, wherein the first wavelength is identical to the second wavelength.

3. The system of claim 1, wherein the first and second wavelengths are in the 1550 nm wavelength band.

4. The system of claim 1, wherein Charlie includes a bypass optical path that bypasses the up-down conversion unit so that the reference signals do not pass through the up-down conversion unit.

5. The system of claim 1, wherein the first and second phase-delay loops comprise optical fibers.

6. The system of claim 5, wherein Charlie includes an optical fiber phase delay loop.

* * * * *